United States Patent
Cakir et al.

(10) Patent No.: US 12,499,146 B2
(45) Date of Patent: Dec. 16, 2025

(54) MACHINE LEARNING AND NATURAL LANGUAGE PROCESSING (NLP)-BASED SYSTEM FOR SYSTEM-ON-CHIP (SoC) TROUBLESHOOTING

(71) Applicant: QUALCOMM Incorporated, San Diego, CA (US)

(72) Inventors: Murat Cakir, San Diego, CA (US); Lindsey Makana Kostas, San Diego, CA (US); Narasimhan Narayanan, San Diego, CA (US); Jonathan Charles Brauer, Austin, TX (US); Michael Robert Manahan, Rancho Mission Viejo, CA (US); Ruitao Dou, Irvine, CA (US); Yanjia Chen, San Diego, CA (US); Pradeep Mohanan Nair, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/340,771

(22) Filed: Jun. 23, 2023

(65) Prior Publication Data
US 2024/0086445 A1    Mar. 14, 2024

Related U.S. Application Data

(60) Provisional application No. 63/404,846, filed on Sep. 8, 2022.

(51) Int. Cl.
G06F 16/00    (2019.01)
G06F 16/35    (2019.01)
G06F 16/38    (2019.01)

(52) U.S. Cl.
CPC .............. *G06F 16/35* (2019.01); *G06F 16/38* (2019.01)

(58) Field of Classification Search
CPC .................................. G06F 16/35; G06F 16/38
(Continued)

(56) References Cited

U.S. PATENT DOCUMENTS 11,281,521 B1 *    3/2022    Petkar ................. G06F 11/0751
2015/0310159 A1 *  10/2015   Raghavan .............. G01R 31/00
                                                          716/112

(Continued)

OTHER PUBLICATIONS

Ferland N., et al., "Automatically Resolve Trouble Tickets with Hybrid NLP", 2020 IEEE Symposium Series on Computational Intelligence, Dec. 1, 2020, pp. 1334-1340.

(Continued)

*Primary Examiner* — Charles Rones
*Assistant Examiner* — Shirley D Hicks
(74) *Attorney, Agent, or Firm* — Seyfarth Shaw LLP

(57) ABSTRACT

A method for processor-implemented method includes receiving an integrated circuit (IC) troubleshooting query for an IC. The IC troubleshooting query is received from a user. The method also includes performing natural language processing and machine learning to cluster the IC troubleshooting query into one of a number of semantically similar troubleshooting categories. The method further includes retrieving resolution data from an expert system library, based on a mapping between categories of user solutions and a topic of the IC troubleshooting query. The method also includes generating a recommendation in response to the IC troubleshooting query, based on the resolution data. The method outputs the recommendation to the user.

27 Claims, 13 Drawing Sheets

(58) Field of Classification Search
USPC .................................................. 707/600–899
See application file for complete search history.

(56) References Cited

U.S. PATENT DOCUMENTS

2019/0220695 A1    7/2019  Nefedov
2021/0342212 A1*  11/2021  Neumann ................ G06N 3/09

OTHER PUBLICATIONS

International Search Report and Written Opinion—PCT/US2023/026170—ISA/EPO—Oct. 2, 2023.

* cited by examiner

| | Rule | Example |
|---|---|---|
| Tool Versions | Separate tool type and version; version removed as text input and added as a metadata filter | INNOVUS-20.15-e031_1 → INNOVUS [filter: 20.15-e031_1] |
| Host/Machine Names | Identify by pattern matching; replace with respective SENTINEL; and add as metadata filter | "hostname san-s4b-22250" → "hostname <type>host" |
| Punctuation | Replace with space if neither preceding or succeeding characters is not a number, else with empty string if either preceding characters is not a number, else do nothing | 20.15-e031_1 → 20.15-e031_1 "not connected/responsive" → "not connected responsive" |
| Longest common sequence | Concatenate two strings if match previously observed/learned longest common patterns. | core 0 → core0 J-Tag → JTag → jtag |
| Abbreviations/ Acronyms | Standardize across domain-specific acronyms | TRACE32 → t32 windowsPC → winpc |
| Tokenization | Split on whitespace | |
| N-Grams | Collect unigrams, bigrams, and trigrams → filter by learned importance to down select subset of critical features | |

*FIG. 13*

MACHINE LEARNING AND NATURAL LANGUAGE PROCESSING (NLP)-BASED SYSTEM FOR SYSTEM-ON-CHIP (SoC) TROUBLESHOOTING

CROSS-REFERENCE TO RELATED APPLICATION

The present application claims the benefit of U.S. Provisional Patent Application No. 63/404,846, filed on Sep. 8, 2022, and titled "MACHINE LEARNING AND NATURAL LANGUAGE PROCESSING (NLP)-BASED SYSTEM FOR SYSTEM-ON-CHIP (SoC) TROUBLESHOOTING," the disclosure of which is expressly incorporated by reference in its entirety.

FIELD OF THE DISCLOSURE

The present disclosure relates generally to troubleshooting and debugging of semiconductor devices, and more specifically to a machine learning and natural language processing-based system for system-on-chip (SoC) troubleshooting.

BACKGROUND

Customer service provided by an integrated circuit (IC) (e.g., chip) company may include responsibilities such as troubleshooting and debugging issues arising from their chips. These chips, especially system-on-chips (SoCs), have become more complex over time. The number of technical issues encountered with these SoCs has increased as the SoCs have become more complex. As a result, the demand for company resources assigned to troubleshooting the SoCs has increased. Artificial intelligence/machine learning may be employed to alleviate the strain on customer service resources allocated to troubleshooting SoCs.

Machine learning may be implemented with artificial neural networks comprising interconnected groups of artificial neurons (e.g., neuron models). The artificial neural network may be a computational device or represented as a method to be performed by a computational device. Convolutional neural networks, such as deep convolutional neural networks, are a type of feed-forward artificial neural network. Convolutional neural networks may include layers of neurons that may be configured in a tiled receptive field. Support vector machines are machine learning classifiers. A support vector machine locates a decision boundary (e.g., hyperplane) in space to classify data points in the space. It would be desirable to apply machine learning to troubleshooting of semiconductor devices in order to achieve greater efficiencies.

SUMMARY

In aspects of the present disclosure, a processor-implemented method includes receiving an integrated circuit (IC) troubleshooting query for an IC. The IC troubleshooting query is received from a user. The method also includes performing natural language processing and machine learning to cluster the IC troubleshooting query into one of a number of semantically similar troubleshooting categories. The method further includes retrieving resolution data from an expert system library, based on a mapping between categories of user solutions and a topic of the IC troubleshooting query. The method also includes generating a recommendation in response to the IC troubleshooting query, based on the resolution data. The method outputs the recommendation to the user.

Other aspects of the present disclosure are directed to an apparatus. The apparatus has a memory and one or more processors coupled to the memory. The processor(s) is configured to receive an integrated (IC) troubleshooting query for an IC. The IC troubleshooting query is received from a user. The processor(s) is also configured to perform natural language processing and machine learning to cluster the IC troubleshooting query into one of a number of semantically similar troubleshooting categories. The processor(s) is further configured to retrieve resolution data from an expert system library, based on a mapping between categories of user solutions and a topic of the IC troubleshooting query. The processor(s) is also configured to generate a recommendation in response to the IC troubleshooting query, based on the resolution data, and to output the recommendation to the user.

Other aspects of the present disclosure are directed to an apparatus. The apparatus includes means for receiving an integrated circuit (IC) troubleshooting query for an IC, the IC troubleshooting query received from a user. The apparatus also includes means for performing natural language processing and machine learning to cluster the IC troubleshooting query into one of a number of semantically similar troubleshooting categories. The apparatus further includes means for retrieving resolution data from an expert system library, based on a mapping between categories of user solutions and a topic of the IC troubleshooting query. The apparatus also includes means for generating a recommendation in response to the IC troubleshooting query, based on the resolution data. The apparatus further includes means for outputting the recommendation to the user.

In other aspects of the present disclosure, a non-transitory computer-readable medium with program code recorded thereon is disclosed. The program code is executed by a processor and includes program code to receive an integrated circuit (IC) troubleshooting query for an IC, the IC troubleshooting query received from a user. The program code also includes program code to perform natural language processing and machine learning to cluster the IC troubleshooting query into one of a number of semantically similar troubleshooting categories. The program code further includes program code to retrieve resolution data from an expert system library, based on a mapping between categories of user solutions and a topic of the IC troubleshooting query. The program code also includes program code to generate a recommendation in response to the IC troubleshooting query, based on the resolution data. The program code includes program code to output the recommendation to the user.

Aspects generally include a method, apparatus, system, computer program product, non-transitory computer-readable medium, user equipment, base station, wireless communication device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims.

Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that features of the present disclosure can be understood in detail, a particular description may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

FIG. 13 illustrates a table for domain-aware smart parsing and representation, in accordance with aspects of the present disclosure.

DETAILED DESCRIPTION

Figure 1:
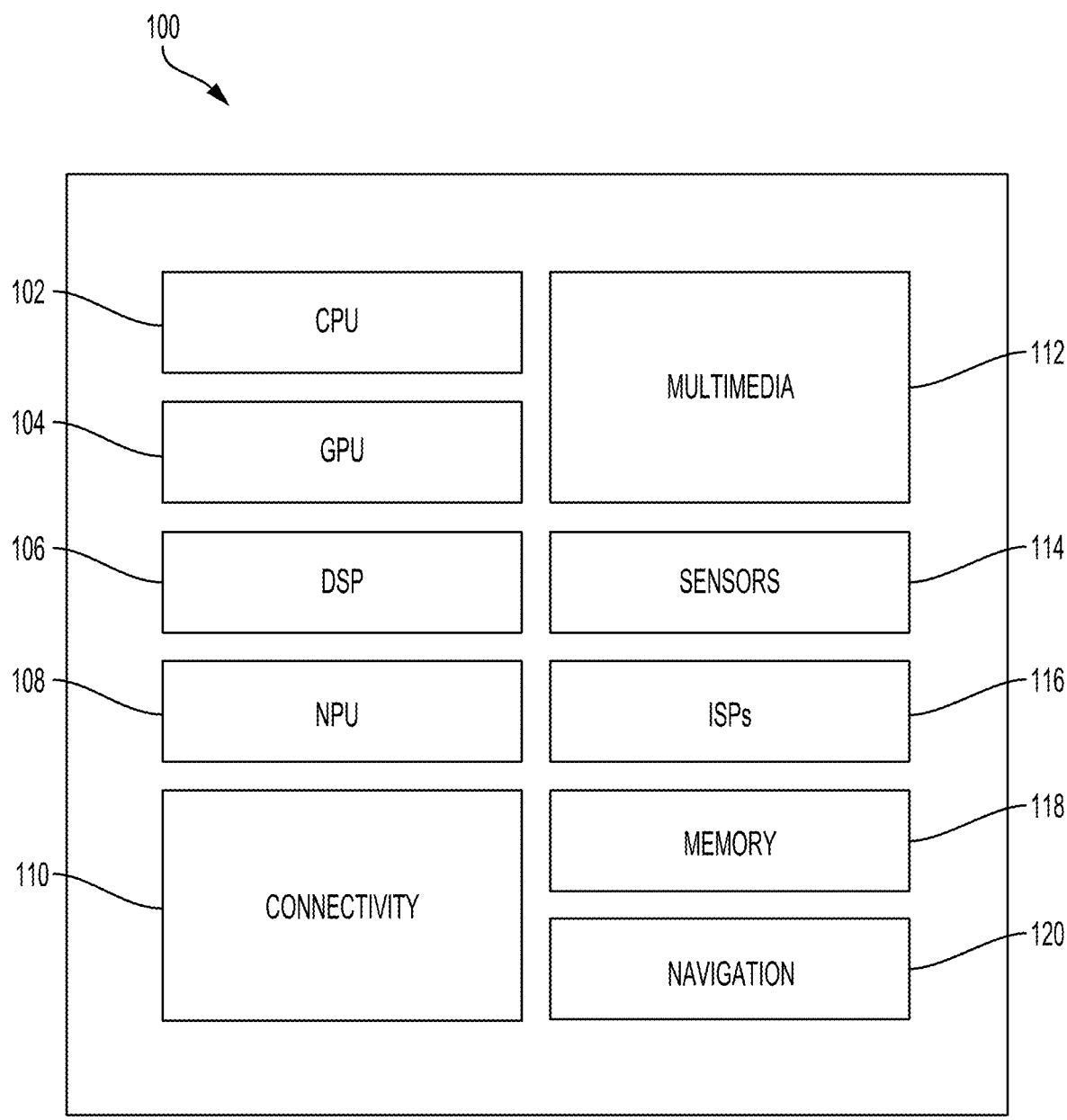
FIG. 1 illustrates an example implementation of designing a neural network using a system-on-chip (SoC), including a general-purpose processor, in accordance with certain aspects of the present disclosure.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of troubleshooting systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

As system-on-chips (SoCs) become more complex, the number of problems found in those SoCs may increase. Resources, such as technicians and debuggers, for addressing the problems (e.g., trouble tickets) may be limited due to a high volume of trouble tickets, limited time for solving the issues, and an increased complexity of the issues. Moreover, the know-how for debugging can be local. Consequently, it may be desirable to use a data driven approach that learns patterns from big data to address and debug the issues related to SoCs.

SoCs may be tested with emulation platforms and test chips. Emulation platforms, for example, may be implemented with field programmable gate arrays (FPGAs) programmed to operate as virtual chips to enable testing of chip designs. After a design has been approved, test chips (e.g., application specific integrated chips (ASICs)) may be fabricated. Test chips enable testing of the silicon to locate and fix issues before committing to large scale production of the chip.

Aspects of the present disclosure introduce a machine learning and natural language processing-based integrated circuit (IC) troubleshooting system, such as an SoC troubleshooting system. Deploying the troubleshooting system may decrease the turnaround time for chip troubleshooting and ultimately chip manufacturing. The troubleshooting system may also increase the chip quality, increase customer satisfaction with emulation platform usage, and reduce return material authorization (RMA) processing of chips.

According to aspects of the present disclosure, the machine learning and natural language processing-based troubleshooting system continuously updates a machine derived mapping between experience and a query-able knowledge base. The troubleshooting system employs an SoC domain-aware automated design troubleshooting methodology.

In some aspects, integrated customizable filters may be applied on top of any natural language processing. For example, a filter may indicate whether an emulation platform or test chip is being used, or may indicate which subsystem or sub-block has raised the issue needing be solved. In some aspects, engineer comments during a previous issue resolution are considered in order to regularize the creation of clusters. A comment agnostic assignment system may be employed for new issues. Aspects provide a predictive system focusing on root causes, learning from prior resolutions to identify an optimal resolution or to troubleshoot errors. Dynamic parsing may occur in the data preparation and tokenization processes for SoC-specific combinations. The troubleshooting system of the present disclosure improves the user experience with a recommendation engine that generates similar issues and potential remedies for the user's trouble ticket. More specifically, the predictive application retrieves problem (e.g., resolution) data from expert system libraries for each subsystem, and sub-block associated with various register transfer level (RTL) designs and generates recommendations to remediate the error or failure. The recommendations may include a number of prior related tickets that are relevant to the IC troubleshooting query (to assist with self-debugging), an expert technician assigned to the IC troubleshooting query, as well as a self-help guide with step-by-step instructions for solving the issue. The predictive application may be referred to as a TroubleSnap Dr. Machine Learning and Natural Language Processing (NLP)-based System for SoC Troubleshooting.

FIG. 1 illustrates an example implementation of a system-on-chip (SoC) 100, which may include a central processing unit (CPU) 102 or a multi-core CPU, in accordance with certain aspects of the present disclosure. The SoC 100 may have issues that need troubleshooting by the SoC vendor. Variables (e.g., neural signals and synaptic weights), system parameters associated with a computational device (e.g., neural network with weights), delays, frequency bin information, and task information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, or may be distributed across multiple blocks. Instructions executed at the CPU 102 may be loaded from a program memory associated with the CPU 102 or may be loaded from a memory block 118.

The SoC 100 may also include additional processing blocks tailored to specific functions, such as a GPU 104, a DSP 106, a connectivity block 110, which may include fifth generation (5G) connectivity, fourth generation long term evolution (4G LTE) connectivity, Wi-Fi connectivity, USB connectivity, Bluetooth connectivity, and the like, and a multimedia processor 112 that may, for example, detect and recognize gestures. In one implementation, the NPU is implemented in the CPU, DSP, and/or GPU. The SoC 100 may also include a sensor processor 114, image signal processors (ISPs) 116, and/or navigation module 120, which may include a global positioning system.

The SoC 100 may be based on an ARM instruction set. In an aspect of the present disclosure, the instructions loaded into the general-purpose processor 102 may comprise code to receive an integrated circuit (IC) troubleshooting query for an IC. The IC troubleshooting query is received from a user. The instructions loaded into the general-purpose processor 102 may also comprise code to perform natural language processing and machine learning to cluster the IC troubleshooting query into one of a number of semantically similar troubleshooting categories. The instructions loaded into the general-purpose processor 102 may further comprise code to retrieve resolution data from an expert system library, based on a mapping between categories of user solutions and a topic of the IC troubleshooting query. The instructions loaded into the general-purpose processor 102 may also comprise code to generate a recommendation in response to the IC troubleshooting query, based on the resolution data. The instructions loaded into the general-purpose processor 102 may comprise code to output the recommendation to the user.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still, higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 2:
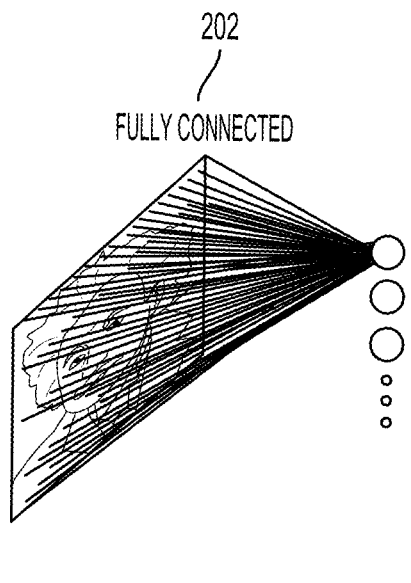
FIGS. 2, 3, and 4 are diagrams illustrating a neural network, in accordance with aspects of the present disclosure.
Figure 3:
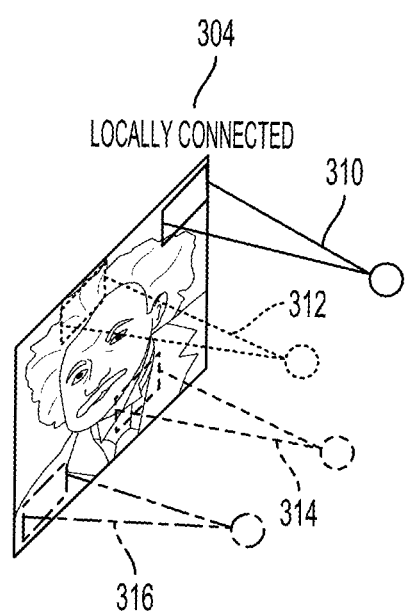

The connections between layers of a neural network may be fully connected or locally connected. FIG. 2 illustrates an example of a fully connected neural network 202. In a fully connected neural network 202, a neuron in a first layer may communicate its output to every neuron in a second layer, so that each neuron in the second layer will receive input from every neuron in the first layer. FIG. 3 illustrates an example of a locally connected neural network 304. In a locally connected neural network 304, a neuron in a first layer may be connected to a limited number of neurons in the second layer. More generally, a locally connected layer of the locally connected neural network 304 may be configured so that each neuron in a layer will have the same or a similar connectivity pattern, but with connections strengths that may have different values (e.g., 310, 312, 314, and 316). The locally connected connectivity pattern may give rise to spatially distinct receptive fields in a higher layer, because the higher layer neurons in a given region may receive inputs that are tuned through training to the properties of a restricted portion of the total input to the network.

Figure 4:
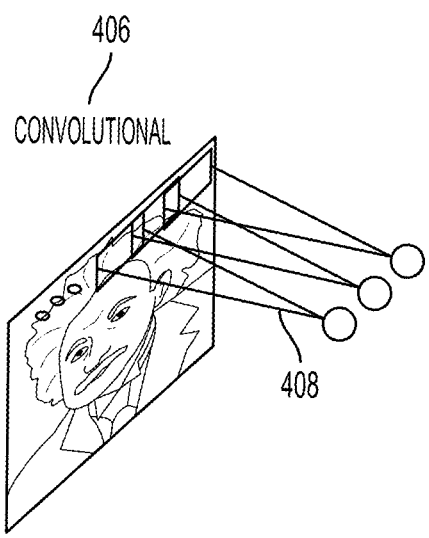

One example of a locally connected neural network is a convolutional neural network. FIG. 4 illustrates an example of a convolutional neural network 406. The convolutional neural network 406 may be configured such that the connection strengths associated with the inputs for each neuron in the second layer are shared (e.g., 408). Convolutional neural networks may be well suited to problems in which the spatial location of inputs is meaningful.

Figure 5:
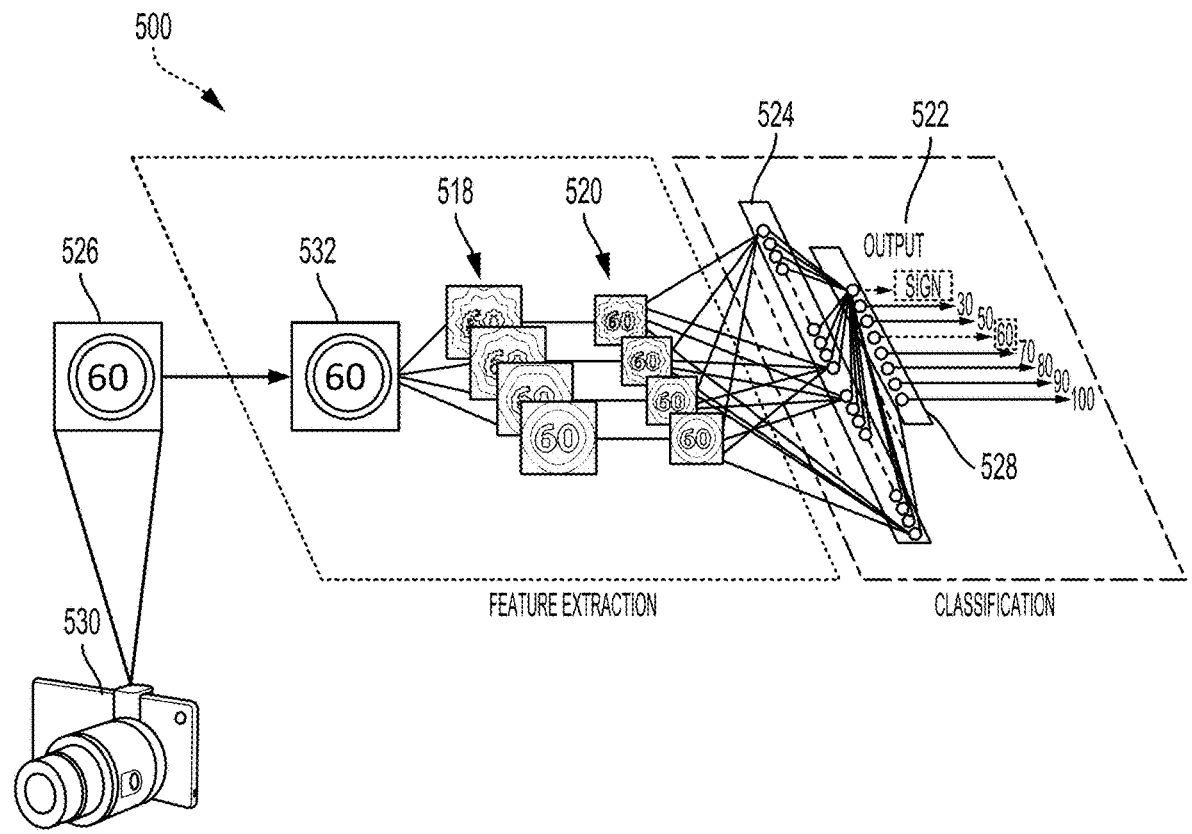
FIG. 5 is a diagram illustrating an exemplary deep convolutional network (DCN), in accordance with aspects of the present disclosure.

One type of convolutional neural network is a deep convolutional network (DCN). FIG. 5 illustrates a detailed example of a DCN 500 designed to recognize visual features from an image 526 input from an image capturing device 530, such as a car-mounted camera. The DCN 500 of the current example may be trained to identify traffic signs and a number provided on the traffic sign. Of course, the DCN 500 may be trained for other tasks, such as identifying lane markings or identifying traffic lights.

The DCN 500 may be trained with supervised learning. During training, the DCN 500 may be presented with an image, such as the image 526 of a speed limit sign, and a forward pass may then be computed to produce an output 522. The DCN 500 may include a feature extraction section and a classification section. Upon receiving the image 526, a convolutional layer 532 may apply convolutional kernels (not shown) to the image 526 to generate a first set of feature maps 518. As an example, the convolutional kernel for the convolutional layer 532 may be a 5×5 kernel that generates 28×28 feature maps. In the present example, because four different feature maps are generated in the first set of feature maps 518, four different convolutional kernels were applied to the image 526 at the convolutional layer 532. The convolutional kernels may also be referred to as filters or convolutional filters.

The first set of feature maps 518 may be subsampled by a max pooling layer (not shown) to generate a second set of feature maps 520. The max pooling layer reduces the size of the first set of feature maps 518. That is, a size of the second set of feature maps 520, such as 14×14, is less than the size of the first set of feature maps 518, such as 28×28. The reduced size provides similar information to a subsequent layer while reducing memory consumption. The second set of feature maps 520 may be further convolved via one or more subsequent convolutional layers (not shown) to generate one or more subsequent sets of feature maps (not shown).

In the example of FIG. 5, the second set of feature maps 520 is convolved to generate a first feature vector 524. Furthermore, the first feature vector 524 is further convolved to generate a second feature vector 528. Each feature of the second feature vector 528 may include a number that corresponds to a possible feature of the image 526, such as "sign," "60," and "100." A softmax function (not shown) may convert the numbers in the second feature vector 528 to a probability. As such, an output 522 of the DCN 500 is a probability of the image 526 including one or more features.

In the present example, the probabilities in the output 522 for "sign" and "60" are higher than the probabilities of the others of the output 522, such as "30," "40," "50," "70," "80," "90," and "100". Before training, the output 522 produced by the DCN 500 is likely to be incorrect. Thus, an error may be calculated between the output 522 and a target output. The target output is the ground truth of the image 526 (e.g., "sign" and "60"). The weights of the DCN 500 may then be adjusted so the output 522 of the DCN 500 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN may be presented with new images (e.g., the speed limit sign of the image 526) and a forward pass through the network may yield an output 522 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., 520) receiving input from a range of neurons in the previous layer (e.g., feature maps 518) and from each of the multiple channels. The values in the feature map may be further processed with a non-linearity, such as a rectification, max(0, x). Values from adjacent neurons may be further pooled, which corresponds to down sampling, and may provide additional local invariance and dimensionality reduction. Normalization, which corresponds to whitening, may also be applied through lateral inhibition between neurons in the feature map.

The performance of deep learning architectures may increase as more labeled data points become available or as computational power increases. Modern deep neural networks are routinely trained with computing resources that are thousands of times greater than what was available to a typical researcher just fifteen years ago. New architectures and training paradigms may further boost the performance of deep learning. Rectified linear units may reduce a training issue known as vanishing gradients. New training techniques may reduce over-fitting and thus enable larger models to achieve better generalization. Encapsulation techniques may abstract data in a given receptive field and further boost overall performance.

Figure 6:
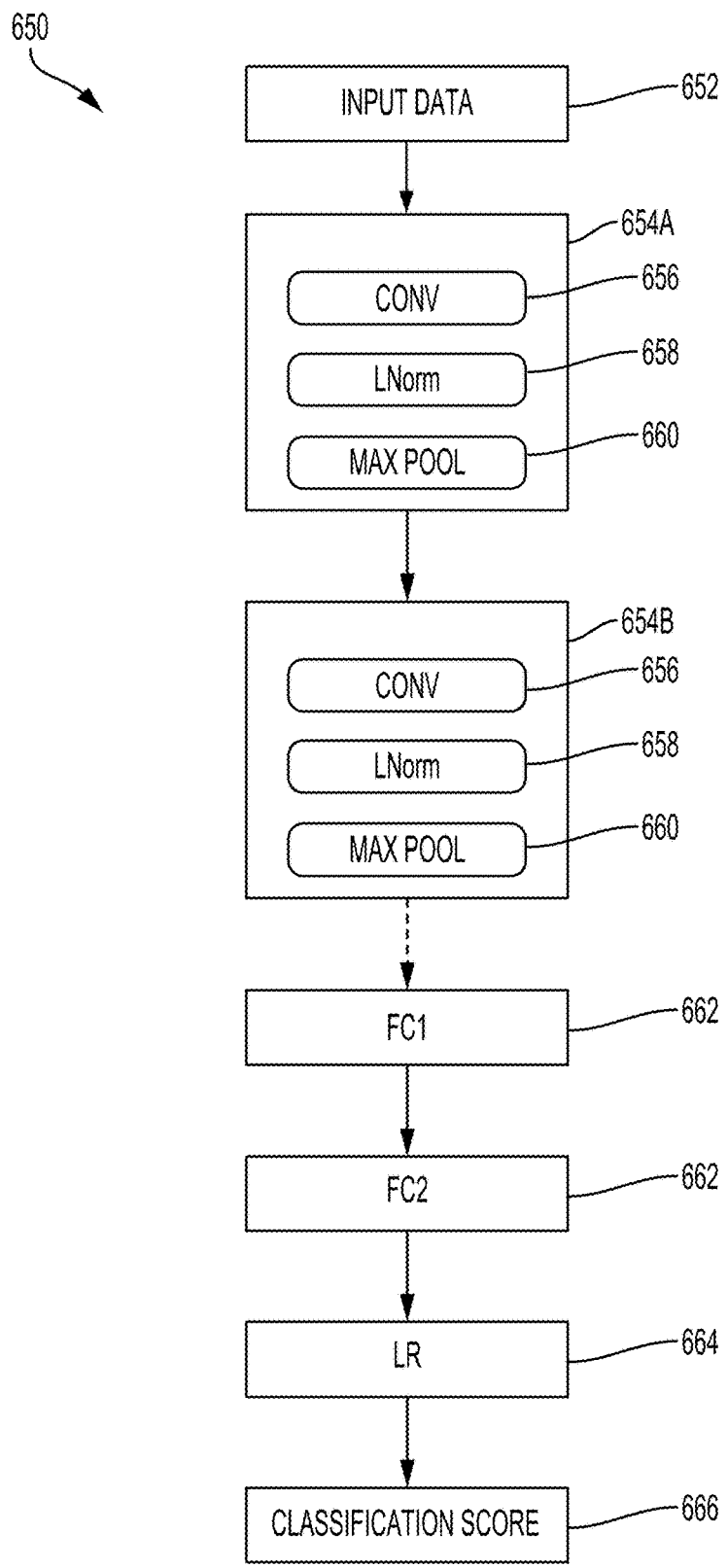
FIG. 6 is a block diagram illustrating an exemplary deep convolutional network (DCN), in accordance with aspects of the present disclosure.

FIG. 6 is a block diagram illustrating a deep convolutional network 650. The deep convolutional network 650 may include multiple different types of layers based on connectivity and weight sharing. As shown in FIG. 6, the deep convolutional network 650 includes the convolution blocks 654A, 654B. Each of the convolution blocks 654A, 654B may be configured with a convolution layer (CONV) 656, a normalization layer (LNorm) 658, and a max pooling layer (MAX POOL) 660.

The convolution layers 656 may include one or more convolutional filters, which may be applied to the input data to generate a feature map. Although only two of the convolution blocks 654A, 654B are shown, the present disclosure is not so limiting, and instead, any number of the convolution blocks 654A, 654B may be included in the deep convolutional network 650 according to design preference. The normalization layer 658 may normalize the output of the convolution filters. For example, the normalization layer 658 may provide whitening or lateral inhibition. The max pooling layer 660 may provide down sampling aggregation over space for local invariance and dimensionality reduction.

The parallel filter banks, for example, of a deep convolutional network may be loaded on a CPU 102 or GPU 104 of an SoC 100 to achieve high performance and low power consumption. In alternative embodiments, the parallel filter banks may be loaded on the DSP 106 or an ISP 116 of an SoC 100. In addition, the deep convolutional network 650 may access other processing blocks that may be present on the SoC 100, such as sensor processor 114 and navigation module 120, dedicated, respectively, to sensors and navigation.

The deep convolutional network 650 may also include one or more fully connected layers 662 (FC1 and FC2). The deep convolutional network 650 may further include a logistic regression (LR) layer 664. Between each layer 656, 658, 660, 662, 664 of the deep convolutional network 650 are weights (not shown) that are to be updated. The output of each of the layers (e.g., 656, 658, 660, 662, 664) may serve as an input of a succeeding one of the layers (e.g., 656, 658, 660, 662, 664) in the deep convolutional network 650 to learn hierarchical feature representations from input data 652 (e.g., images, audio, video, sensor data and/or other input data) supplied at the first of the convolution blocks 654A. The output of the deep convolutional network 650 is a classification score 666 for the input data 652. The classification score 666 may be a set of probabilities, where each probability is the probability of the input data, including a feature from a set of features.

As system-on-chips (SoCs) (e.g., the SoC 100 shown in FIG. 1) become more complex, the number of problems found in those SoCs may increase. Because the volume of trouble tickets is high, the time for solving the issues is limited, and the complexity of the issues is increasing, the resources for addressing the trouble tickets (e.g., technicians and debuggers) is challenged. Moreover, the know-how for debugging can be local. Consequently, it may be desirable to use a data driven approach that learns patterns from big data to address and debug the issues related to SoCs.

SoCs may be tested with emulation platforms and test chips. Emulation platforms, for example, may be implemented with field programmable gate arrays (FPGAs) programmed to operate as virtual chips to enable testing of chip designs. After a design has been approved, test chips (e.g., application specific integrated chips (ASICs)) may be fabricated. Test chips enable testing of the silicon to locate and fix issues before committing to large scale production of the chip.

Aspects of the present disclosure introduce a machine learning and natural language processing-based SoC troubleshooting system. Although an SoC troubleshooting system is described, the techniques of the present disclosure are equally applicable to any type of integrated circuit (IC). Deploying the troubleshooting system may decrease the turnaround time for chip troubleshooting and ultimately chip manufacturing. The troubleshooting system may also increase the chip quality, increase customer satisfaction with emulation platform usage (e.g., with business to business cases), and reduce return material authorization (RMA) processing of chips.

According to aspects of the present disclosure, the machine learning and natural language processing-based troubleshooting system continuously updates a machine derived mapping between experience and a query-able knowledge base. The troubleshooting system employs an SoC domain-aware automated design troubleshooting methodology. By employing specialized natural language processing (NLP) in the Emulation and RMA troubleshooting process, the troubleshooting system is able to include the chip's designer as well as the chip's debugger in the feedback loop. In some aspects, integrated customizable filters may be applied on top of any natural language processing. For example, a filter may indicate whether an emulation platform or test chip is being used, or may indicate which subsystem or sub-block has raised the issue needing be solved. The filters are customizable and may also relate to the SoC's infrastructure, as well as other parameters. The filters may help identify patterns between different register transfer level (RLT) designs and SoCs, and also patterns between blocks and sub-blocks, etc.

In some aspects, engineer comments during a prior issue resolution are considered in order to regularize the creation of clusters. A comment agnostic assignment system may be employed for new issues. Aspects provide a predictive system focusing on root causes, learning from prior resolutions to identify an optimal resolution or to troubleshoot errors. Dynamic parsing may occur in the data preparation and tokenization processes for SoC-specific combinations. The troubleshooting system of the present disclosure improves the user experience with a recommendation engine that generates similar issues and potential remedies for the user's trouble ticket. In some implementations, the results are obtained in under four milliseconds.

While implementing this predictive system, a reduction in RMA count is achieved, decreasing costs. Time to market is improved by reducing turnaround time for overall debugging, which helps for locating register transfer level (RTL) bugs earlier, thus reducing costs to fix these bugs. The predictive system also prevents hardware bugs from moving group to group and eventually to customers, which may include business to business customer distributors as well as other customers. The predictive system facilitates convergence between different SoCs across different tiers, including value, modem, automotive, and extended reality (XR) tiers. Moreover, the predictive system leads to a better robust design of SoCs, subsystems, and other components. This predictive system is dynamically adaptive to many platforms such as simulation acceleration, system emulation, software enablement, pre-silicon and post-silicon, system level tests (SLT)/advanced diagnostic team (ADT), and RMA support.

The machine learning natural language processing-based SoC troubleshooting application facilitates the diagnosis and resolution of issues seen on SoCs. These issues may arise on a chip debug platform, such as with a test chip, or on an emulation platform (e.g., the RUMI emulation platform, available from Qualcomm, Incorporated). According to aspects of the present disclosure, the predictive application retrieves problem (e.g., resolution) data from expert system libraries for each subsystem, and sub-block associated with various RTL designs and generates recommendations to remediate the error or failure. The SoC expert libraries may be stored in company databases. Examples of such databases include JIRA from Atlassian Corporation Plc of Sydney Australia, TARDIS or ClearQuest from IBM Corporation of Armonk, New York, and ORBIT from Oracle Corporation of Redwood Shores, California. The predictive application may be used internally, as well as with external consumers. For example, the application may be used with a productized emulation platform portal for business to business customers, or may be used for RMA to support business to business customers.

Figure 7:
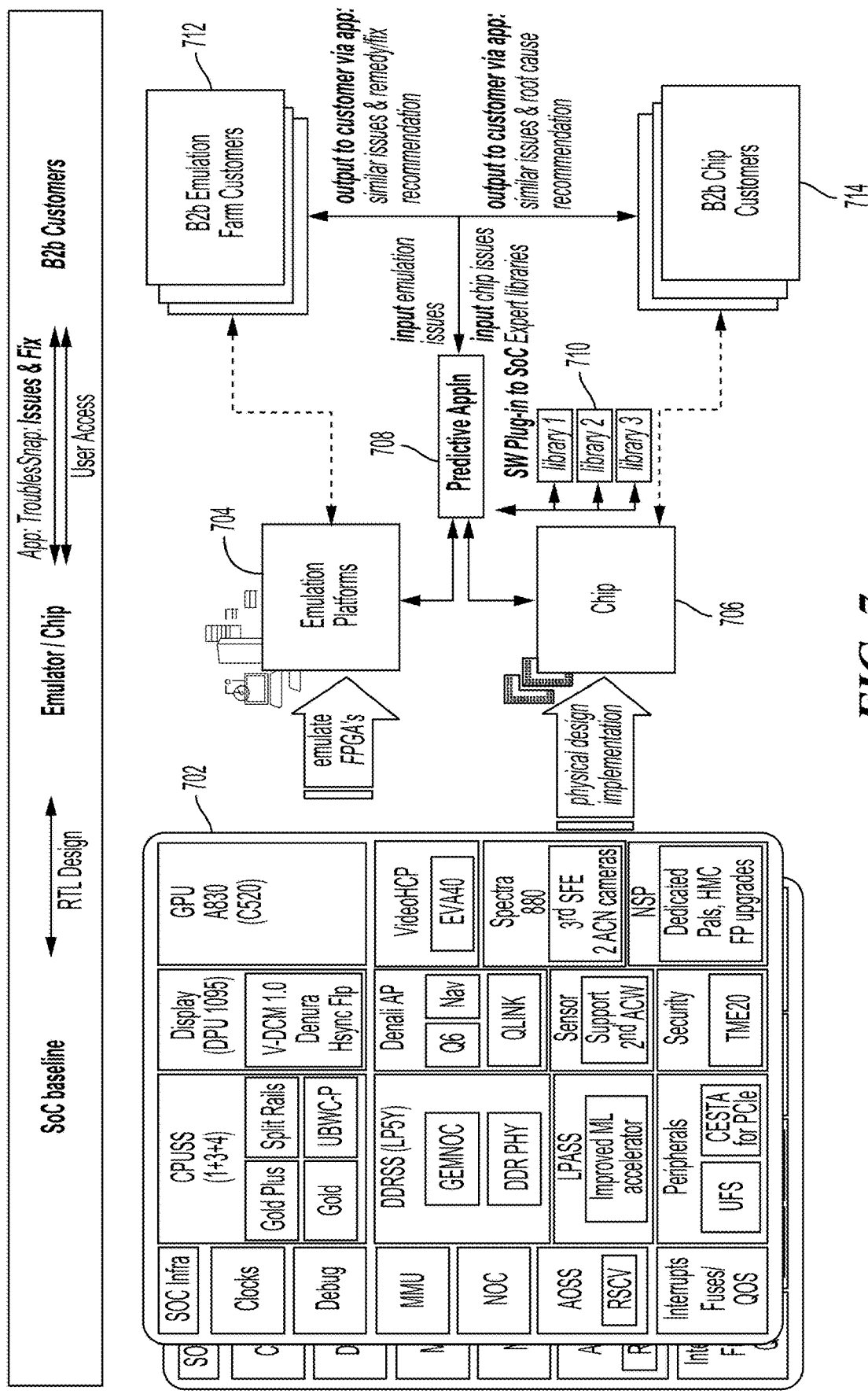
FIG. 7 is a block diagram illustrating applicability of a machine learning natural language processing-based system-on-chip (SoC) troubleshooting application, in accordance with aspects of the present disclosure.

FIG. 7 is a block diagram illustrating applicability of a machine learning natural language processing-based SoC troubleshooting application, in accordance with aspects of the present disclosure. A baseline SoC 702 may include numerous components, such as those illustrated generically in FIG. 1 or the components illustrated more specifically in FIG. 7. An emulation platform 704 may be implemented with field programmable gate arrays (FPGAs) programmed to operate as virtual chips to enable testing of an RTL design of the SoC 702. A test chip 706 (e.g., application specific integrated chip (ASIC)) may also enable testing of the RTL design of the SoC 702. The test chip 706 enables later stage testing to locate and fix issues of the design, as implemented in silicon.

While performing tests on either the emulation platform 704 or the test chip 706, a user may encounter an issue that needs resolution. The user may interact with a predictive application 708 to attempt to solve the issue. As a result, the predictive application 708 receives an IC troubleshooting query from the user. In case the user is operating the emulation platform 704, the IC troubleshooting query is input as an emulation issue to the predictive application 708. In case the user encounters the issue while evaluating the test chip 706, the IC troubleshooting query is input as a chip issue to the predictive application 708. The predictive application processes the IC troubleshooting query and retrieves resolution data from an expert system library 710. Based on the retrieved results, the predictive application 708 outputs a recommendation. In case the user is a business to business (B2B) emulation farm customer 712, the output includes similar issues and a remedy or fix recommendation. After the issues with the emulation platform have been solved, a test chip may be fabricated. In case the user is a B2B chip customer 714, the output includes similar issues and a root cause recommendation. A production chip may be manufactured after these issues with the test chip are resolved. Thus, it can be seen that the predictive application 708 helps engineers with the chip design process. If similar issues arose in the past, the similar issues can help quickly solve the problem for the engineers.

Emulation platforms may be used internally and also provided as a service to external customers for their emulation requirements. According to aspects of the present disclosure, the predictive application 708 is provided to external customers for troubleshooting any failures encountered during their connection to the emulation platform. The customers may access the emulation platform via a portal that coordinates access rights management and visualizes hardware resources that are managed in a load sharing facility (LSF) cluster. The portal may also provide administrative management interfaces that are not exposed to users. Users first gain access to the portal and to the projects relevant to their work. Users may then view and request emulation hardware on a temporary basis from the portal. The users may also generate and submit troubleshooting queries from the portal. In some aspects, the portal enables the users to participate in a federated learning process. With federated learning, devices train and update a single machine learning model and expert library while keeping their own datasets. Communication efficiency, bandwidth optimization, and privacy preservation may be addressed by federated learning systems.

Return merchandise authorization (RMA) is a high-volume operation and accounts for a non-trivial percentage of total supplied parts. Prior to returning chips to the company, software as a service (SaS) business to business customers should seek their own solutions to chip failures. The predictive application 708 may be provided to these customers to help with troubleshooting, prior to the customers initiating an RMA process for the problem chips.

Figure 8:
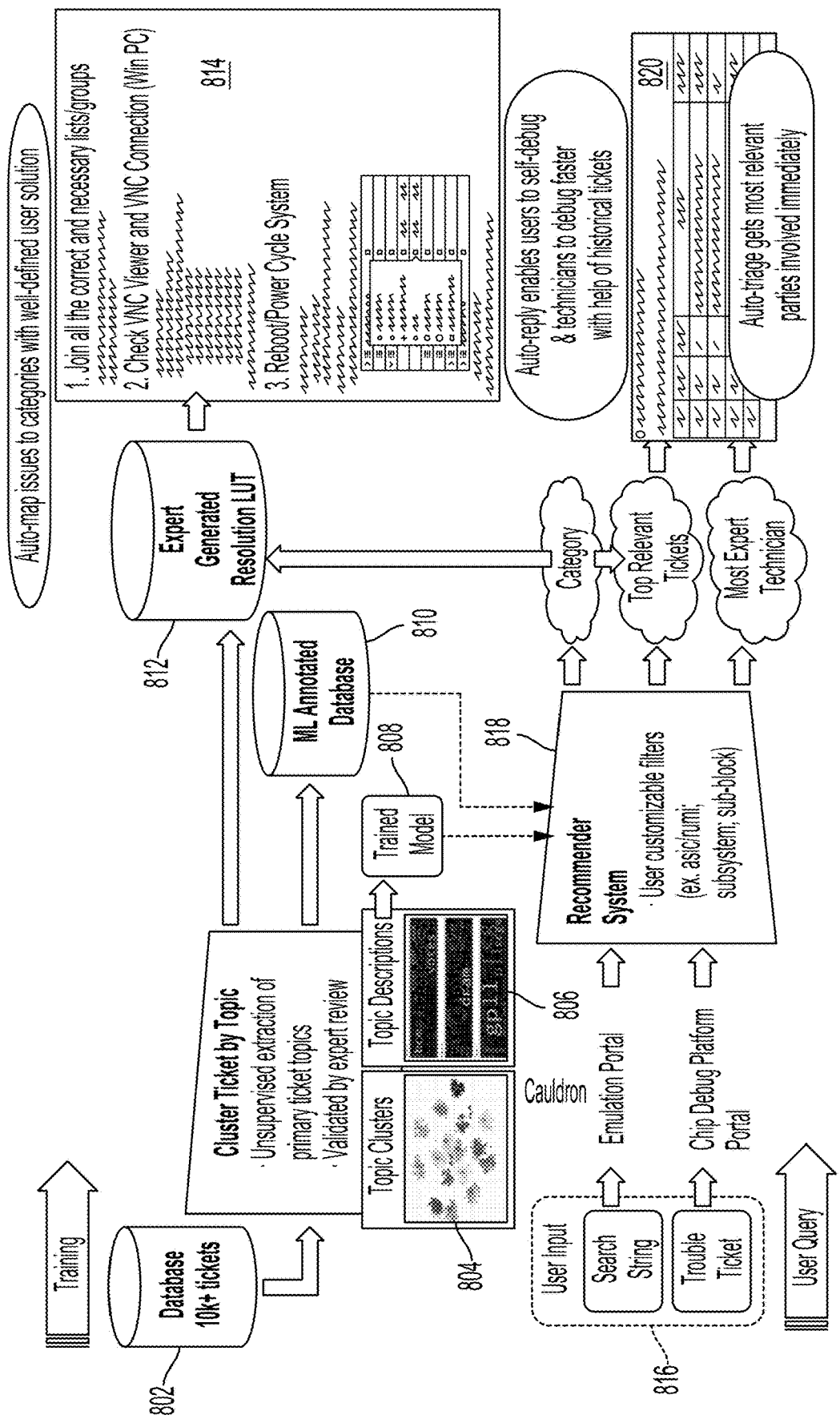
FIG. 8 is a block diagram illustrating training and inference by the machine learning natural language processing-based SoC troubleshooting application, in accordance with aspects of the present disclosure.

FIG. 8 is a block diagram illustrating training and inference by the machine learning natural language processing-based SoC troubleshooting application, in accordance with aspects of the present disclosure. Training includes clustering database tickets by topic. In the example of FIG. 8, a database 802 is a Jira database from Atlassian Corporation Plc, storing more than 10,000 trouble tickets. Clustering the tickets may include unsupervised extraction of primary ticket topics, followed by validation with expert review. Topic clusters 804 are each associated with topic descriptions 806. The topic descriptions 806 are stored in human readable form.

A trained model 808, machine learning (ML) annotated database 810, and an expert generated resolution look-up table (LUT) 812 are created based on the clustered tickets. The trained model 808 is used for inference and may be trained against a full comment body of previous resolution efforts. That is, all correspondence from the time an input query is generated until the time the query was resolved is considered during the training. The machine learning annotated database 810 will also be referred to as a labelled database. The expert generated resolution look-up table 812 may be used to obtain a user self-help guide 814 during inference.

During inference, user input 816 is received from a user encountering an issue. The user input 816 may originate from a portal, such as an emulation portal (e.g., RUMI Access Portal) or a chip debug platform portal (e.g., SysDebug Jira Portal). The user input 816 may include a search string and a trouble ticket. The text based user input 816 (e.g., search string) may have multiple modalities, such as what component the ticket belongs to, and who sent the ticket, as well as other parameters. An unlabeled ticket is split and parsed, as will be described in more detail below, to construct an input space.

A recommender system 818 receives the user input 816 and then applies user customizable filters. For example, the input may be filtered by whether the test chip (e.g., ASIC) or the emulator had encountered the issue triggering the trouble ticket. Other filters, such as sub-block, subsystem, etc., may also be employed. The recommender system 818 uses the trained model 808 and the annotated database 810 to generate output. The output may include a category for the IC troubleshooting query, a number of top relevant tickets 820 that are relevant to the IC troubleshooting query, and an expert technician assigned to the IC troubleshooting query. The expert technician may be selected as the person with the most expertise to help with solving the issues raised by the IC troubleshooting query. The recommender system 818 may recommend the expert technician based on the determined category.

The category determined by the recommender system 818 may be used to perform a look up at the expert generated resolution look up table 812 in order to find well-defined solutions for the category. As result of the look up, the user self-help guide 814 is retrieved and then provided to the user. In the example of FIG. 8, the user self-help guide 814 lists troubleshooting steps to solve the issue raised in the IC troubleshooting query.

The category determined by the recommender system 818 also helps locate the top relevant tickets 820, which enable the user to self-debug the issue. The top relevant tickets 820 may also assist the assigned expert technician. The top relevant tickets 820 include historical tickets that may be similar to the IC troubleshooting query received from the user.

Figure 9:
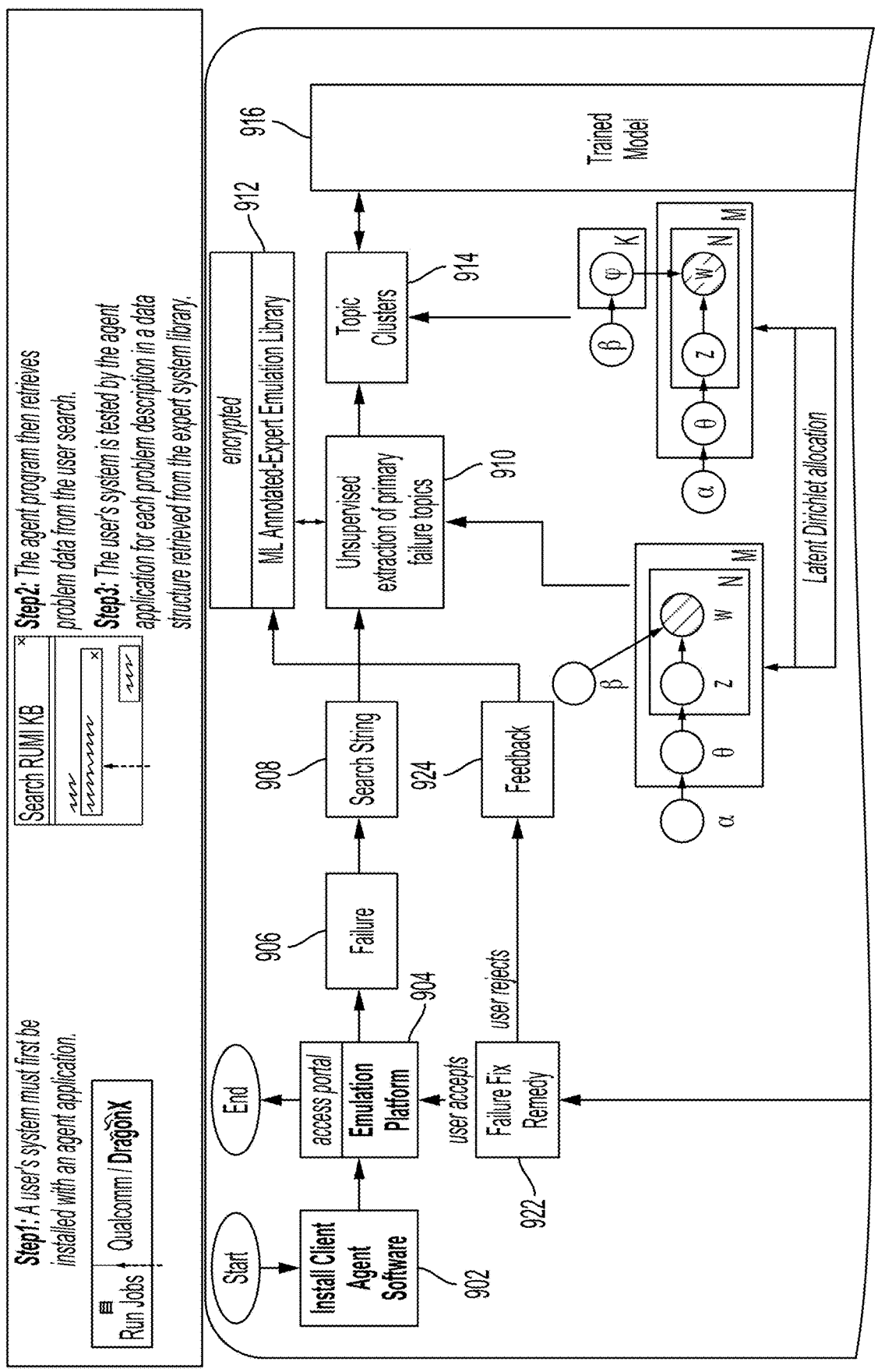
FIG. 9 is a block diagram illustrating a technical implementation of the machine learning natural language processing-based SoC troubleshooting application, in accordance with aspects of the present disclosure.
Figure 9:
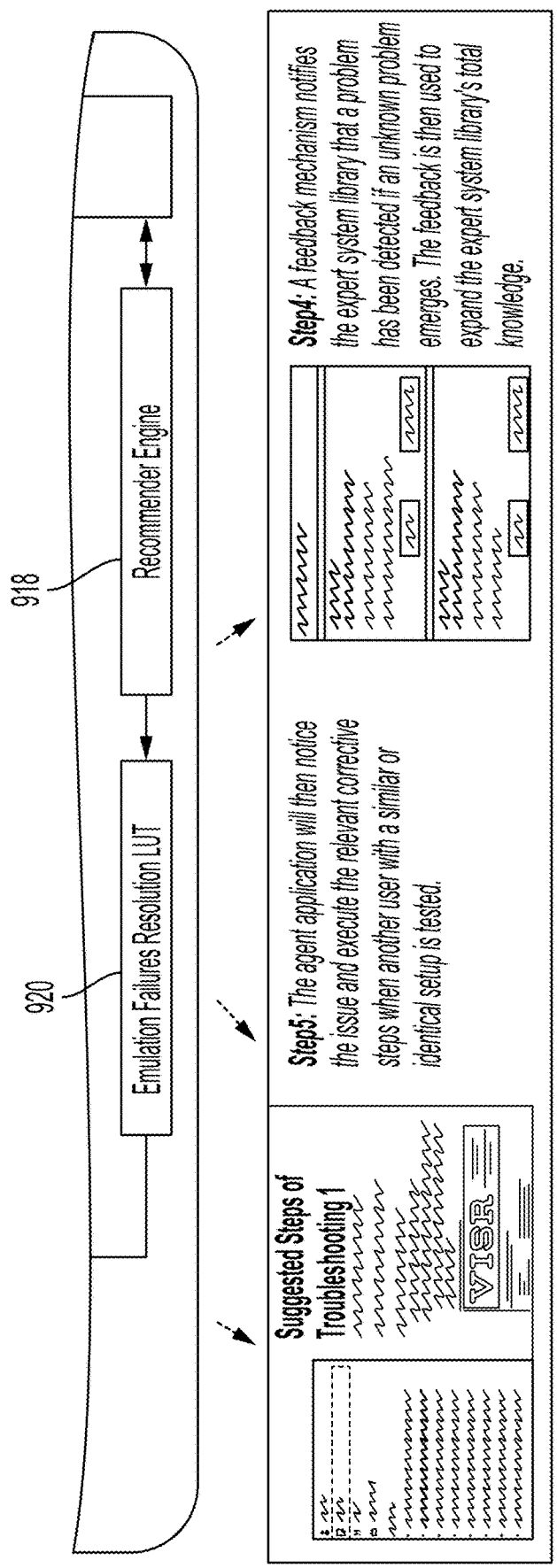

FIG. 9 is a block diagram illustrating a technical implementation of the machine learning natural language processing-based SoC troubleshooting application, in accordance with aspects of the present disclosure. In the example of FIG. 9, a user's system is installed with an agent application (or software) 902. The agent application 902 may appear as a troubleshooting search bar in an access portal of an emulation platform 904. In response to discovering a failure 906 while operating the emulation platform 904, the user may enter a IC troubleshooting query (e.g., search string 908) into the search bar of the portal of the emulation platform 904. The agent application 902 retrieves problem data from the user search string 908 with unsupervised extraction 910 of primary failure topics. Natural language processing may be performed based on a latent Dirichlet allocation to facilitate extracting of the primary failure topics. Natural language processing may help resolve ambiguity in the language and add a numerical structure to the data for further operations. The user's system is then tested by the agent application 902 for each problem description (e.g., primary failure topic) in a data structure retrieved from an expert system library 912 (also referred to as the annotated database 810 in FIG. 8). The expert system library 912 may be encrypted, in some implementations.

After analyzing the expert system library 912, topic clusters 914 are formed. Topic descriptions of the topic clusters 914 may be generated with natural language processing, such as in accordance with a latent Dirichlet allocation, to obtain human readable cluster labels. A trained model 916 receives the topic clusters 914 and communicates with a recommender engine 918 (also referred to as the recommender system 818 in FIG. 8). The recommender engine 918 outputs a category, relevant tickets, and an assigned technician. The agent application 902 searches an emulation failures look up table (LUT) 920 (also referred to as the expert generated resolution LUT 812 in FIG. 8) to map the issue to relevant corrective steps associated with another user with a similar or identical setup. In other words, the agent application 902 recognizes the issue and generates relevant corrective steps in order to troubleshoot the problem. For example, a user self-help guide may be considered a failure fix remedy 922 and presented to the user. If the user accepts the failure fix remedy 922, the process ends. If the user rejects the failure fix remedy 922, feedback 924 occurs. For example, the expert system library 912 may be notified that a new problem has been detected if an unknown problem emerges. The feedback 924 is then used to expand the expert system library's 912 total knowledge. Although FIG. 9 illustrates troubleshooting with an emulation platform 904, the present disclosure is equally applicable with a chip debug tool, such as with a test chip.

Figure 10:
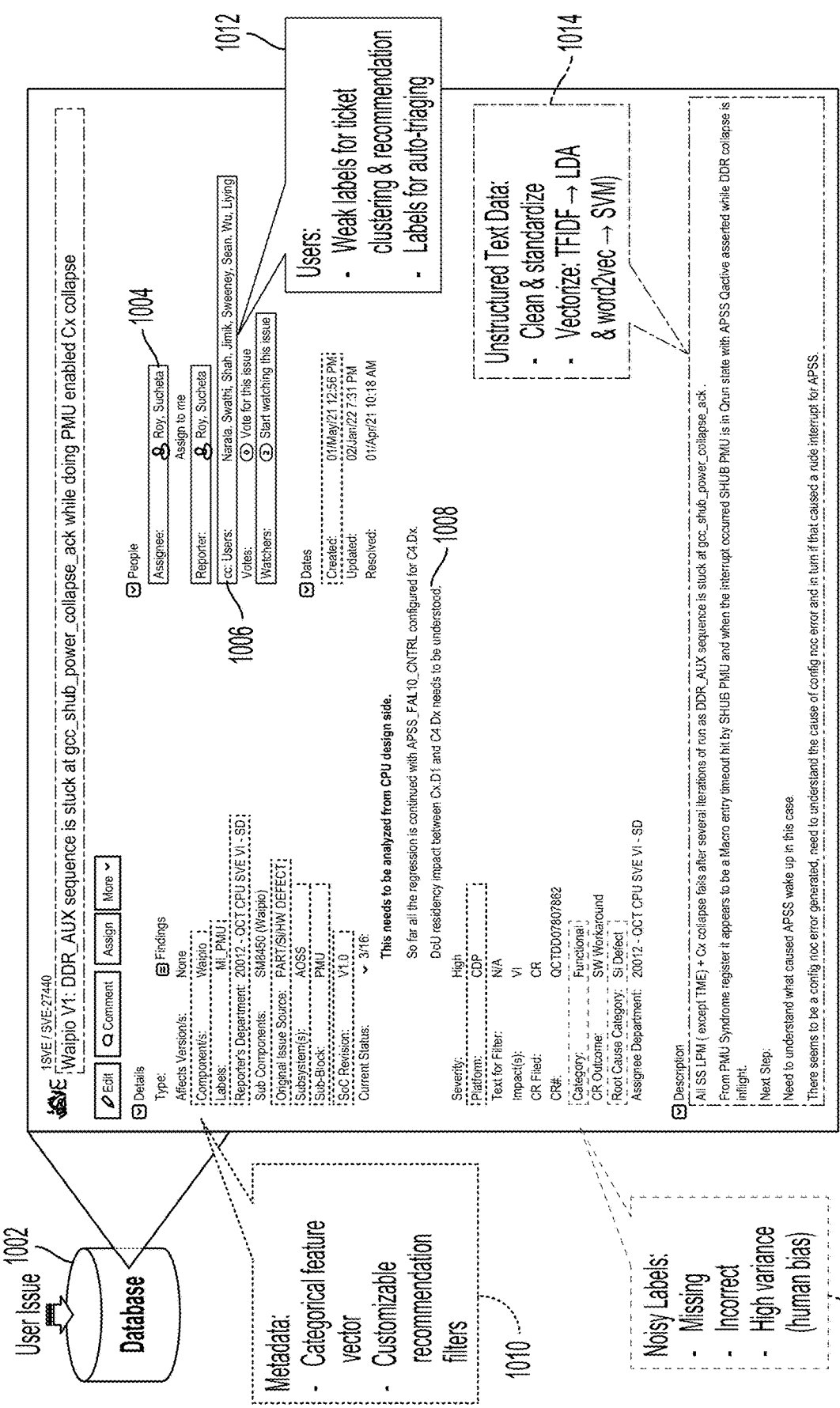
FIG. 10 is a diagram illustrating an integrated circuit (IC) troubleshooting query, in accordance with aspects of the present disclosure.

FIG. 10 is a diagram illustrating an IC troubleshooting query, in accordance with aspects of the present disclosure. When a user observes an issue while running an emulation platform or chip debug system, the user creates a ticket in a database 1002. By employing the machine learning natural language processing-based SoC troubleshooting application of the present disclosure, the ticket may be preemptively closed, without involving a technician. Nevertheless, tickets may be automatically assigned to an expert technician 1004. A "cc:users" field 1006 may be provided to list relevant individuals to whom the IC troubleshooting query is relevant. The machine learning natural language processing-based SoC troubleshooting application may recommend interesting tickets to these users. A debug issue 1008 is input by the user. Relevant historical tickets may be recommended by the recommender system based on prior similar issues and their solutions.

Natural language processing may help resolve ambiguity in the language and add a numerical structure to the data for further operations. To enable the natural language processing, in some aspects of the present disclosure, the data from the trouble ticket is parsed. For example, metadata 1010, such as categorical feature vectors and customizable recommendation filters may be flagged to direct the model. User data 1012 may provide weak labels for ticket clustering and recommendations. For example, the user who created the ticket, the expert technician assigned to the ticket, and other relevant people listed in the ticket may help generate labels for automatic triaging of the ticket. Unstructured text data 1014 may be cleaned and standardized. For example, time frequency inverse document frequency (TF-IDF) data may be input to a latent Dirichlet allocation (LDA) to vectorize the text data. A word2vec technique may employ a neural network to prepare the data for support vector machine (SVM) processing. The SVM processing may be performed during regularization to transform unsupervised data into weakly supervised data based on its classification. Noisy labels 1016 may also be used for weak supervision. These labels may be missing, incorrect, or have a high variance (e.g., due to human bias). The noisy labels provide weak supervision. In other words, because they are approximately correct, the noisy labels can help guide an otherwise unsupervised task. Because the labels are noisy they cannot be used to construct a supervised learning environment.

Ticket text and attributes may be used to group the data into semantically similar clusters. This may be performed by unsupervised machine learning. The clustering facilitates topic extraction and recommendation. Key words may be extracted and used to assign clusters to define each per-cluster topic/category. The recommender system may recommend relevant tickets using feature vector K-nearest neighbors (KNN) within the topic cluster. The KNN algorithm is a supervised learning technique that can be used for regression as well as classification. KNN performs a distance calculation between the test data and all the training points in an effort to determine to which class the data being evaluated should be assigned. The K number of points that are most closely related to the test data should be chosen.

Regularized training will now be described. A goal of regularized training is to embed and cluster issues with respect to their resolutions. In some aspects of the present disclosure, resolutions are captured through all of the back-and-forth text-based discussion between the issue reporter and the assigned technician after the initial issue is raised. The inference, however, should correctly cluster issues based only on the initial query.

Figure 11:
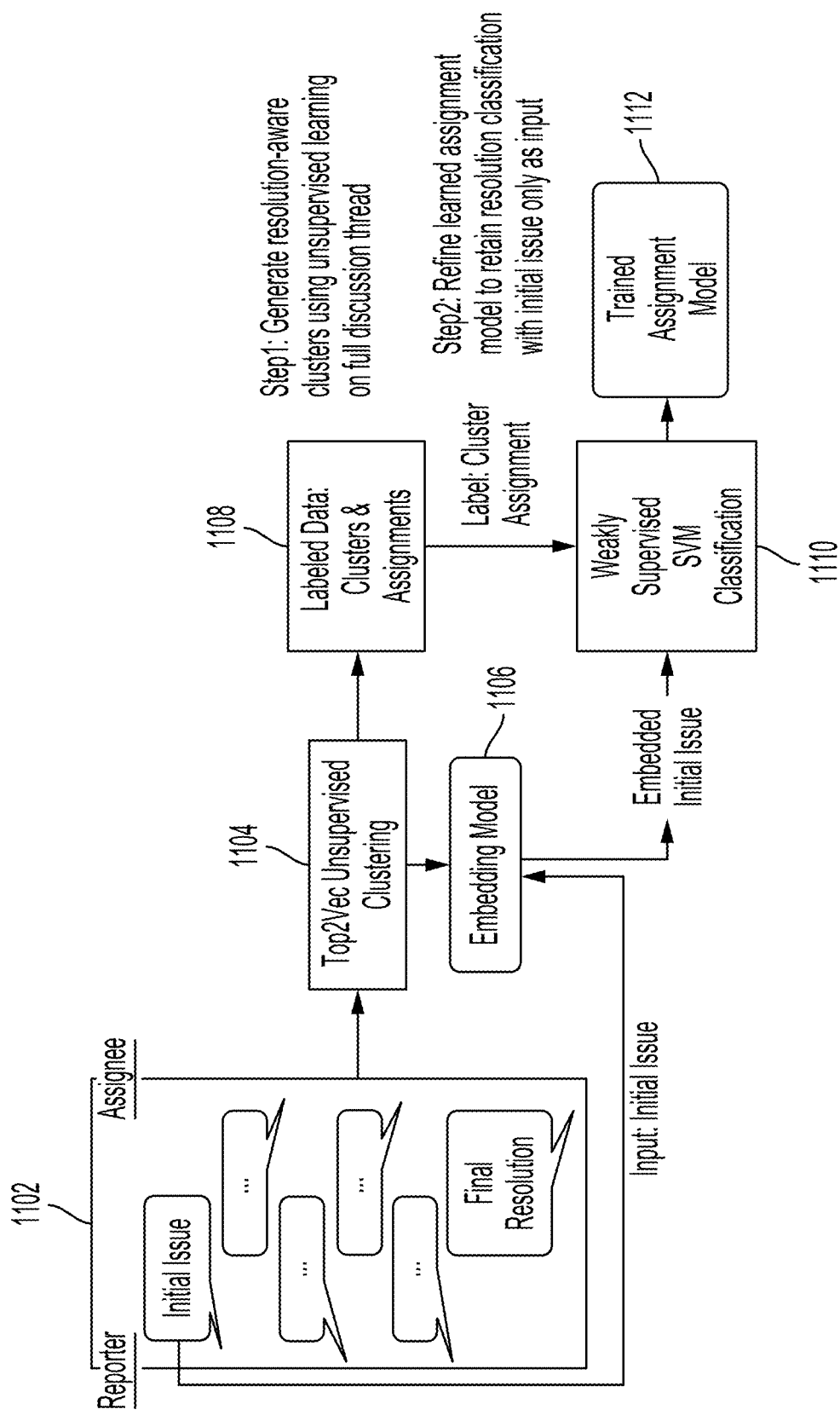
FIG. 11 is a block diagram illustrating regularized training, in accordance with aspects of the present disclosure.

FIG. 11 is a block diagram illustrating regularized training, in accordance with aspects of the present disclosure. A back-and-forth text-based discussion between an issue reporter and an assigned technician is taken as input data 1102. By including the entire discussion, rather than the issue or solution alone, a richer set of data is available for the predictive system. The input data 1102 is clustered by an unsupervised machine learning model 1104. In the example of FIG. 11, the unsupervised machine learning model 1104 is based on the Top2Vec technique, which employs neural network processing to detect topics from input. The unsupervised machine learning model 1104 generates resolution aware clusters using unsupervised learning on the full thread.

An embedding model 1106 is generated based on the input data 1102 and the topics received from the unsupervised machine learning model 1104. The embedding model implemented by Top2Vec jointly learns topic clusters and token embeddings from the training data in an unsupervised setting. The unsupervised machine learning model 1104 generates labeled data 1108, which includes clusters and assignments. Assignments refer to the assignment of an input to one of the previously learned topics (e.g., clusters). The trained assignment model is the same embedding model mentioned above, which jointly learns word embeddings and topics. To create the topics, the model learns how to create clusters of inputs. Those clusters then define the topics. At inference time, new inputs can be fed to this model, which will assign the input to one of the learned topic clusters. The resolution recommendation and assignment of the ticket to a person to address the issue are then based on the assigned topic cluster.

The learned assignment is refined to retain resolution classification with the input data 1102 as the only input. Weakly supervised support vector machine (SVM) classification 1110 occurs based on the embedded initial issue and the labeled data 1108, including the cluster assignment. The two phases of learning create a model that is able to assign inputs without a full correspondence (e.g., at initial ticket filing only) to a cluster on the basis of resolution similarity, which may not always track initial ticket filing similarity. The first phase is unsupervised learned where inputs include the full issue correspondence, and the output is a set of learned topic clusters and assignment of inputs to those clusters. The second phase is weakly supervised learning where inputs are the embeddings of the initial issue only and the output is the topic assignment learned in phase one via an SVM. A trained assignment model 1112 results from the weakly supervised SVM classification 1110.

Figure 12:
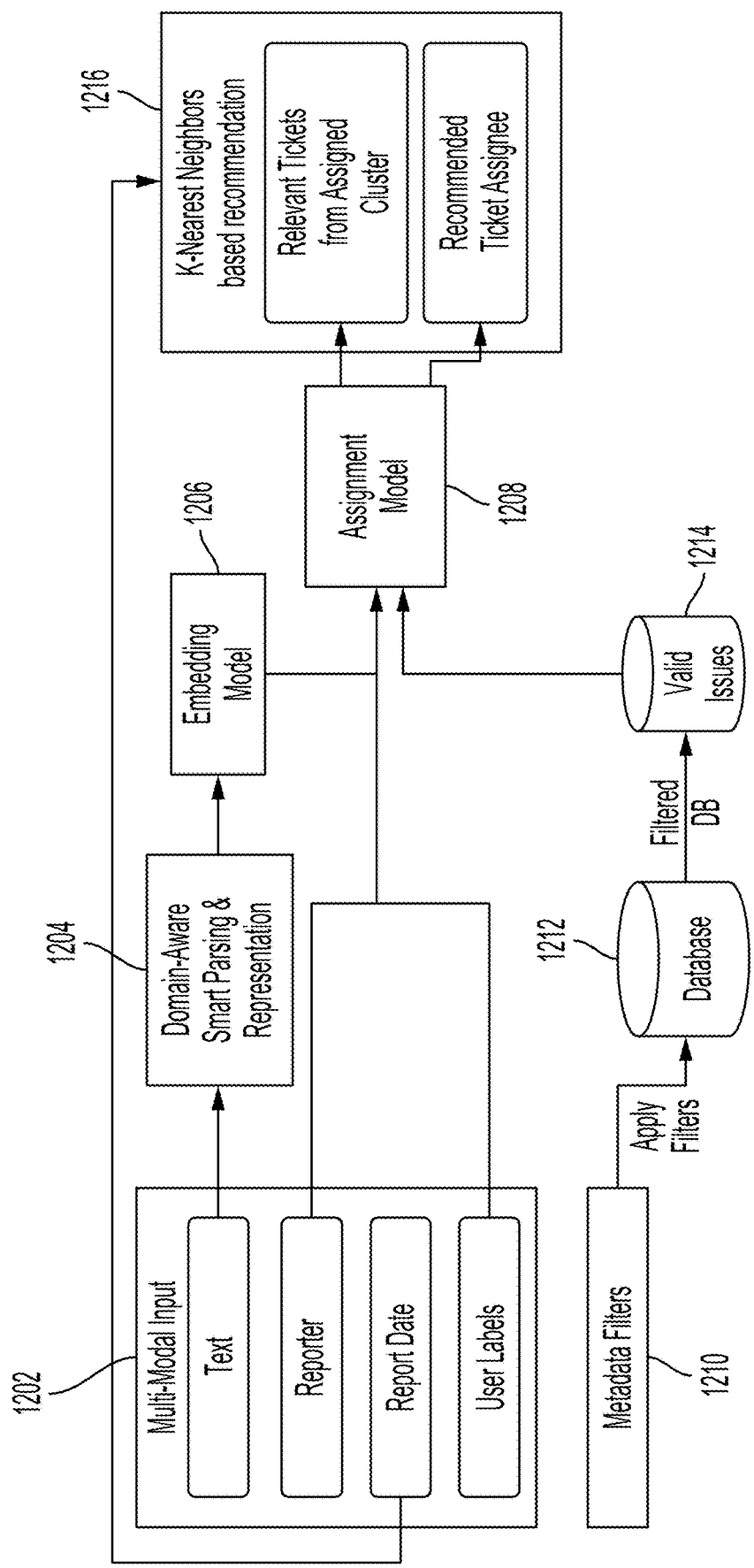
FIG. 12 is a block diagram illustrating a recommendation process, in accordance with aspects of the present disclosure.

FIG. 12 is a block diagram illustrating a recommendation process, in accordance with aspects of the present disclosure. A multi-modal input 1202 may include text, a user reporting the issue (e.g., reporter), a report date, and user labels. The text is received at a domain-aware smart parsing and representation block 1204, which provides output to an embedding model 1206. An assignment model 1208 receives the reporter and user labels from the multi-modal input 1202, as well as information from the embedding model 1206.

The user selects metadata filters 1210, which are applied to a database 1212 to obtain a filtered database 1214 with valid issues. The filtered database 1214 is searched by the assignment model 1208 to obtain a K-nearest neighbor based recommendation 1216. The report date from the multi-modal input 1202 is also directly received for the K-nearest neighbor based recommendation 1216. The K-nearest neighbor based recommendation 1216 may include relevant tickets for the assigned cluster and the recommended ticket assignee (e.g., expert technician). After assigning a ticket to a cluster, the final resolution and ticket assignment recommendations are made using a K-nearest neighbors process, conditioned on additional factors such as recency (e.g., how the report date is used), part of chip, component/component functionality, reporter, etc.

FIG. 13 illustrates a table for domain-aware smart parsing and representation, in accordance with aspects of the present disclosure. The text input within the IC troubleshooting query is subject to parsing and may include numerous elements such as tool versions, host names, machine names, sub-block names, punctuation, a longest common sequence, abbreviations and acronyms, tokenized data, and word sequences, such as n-grams. Each of these elements is associated with its own rule for parsing. Examples of non-limiting rules for parsing will now be described. For tool versions, the tool type and version are separated, the version is removed as text input and added as a metadata filter. Host/machine/sub-block, etc. names are identified by pattern matching, replaced with respective SENTINEL, and added as a metadata filter. SENTINEL is a special token that is a unique signature to identify a type/class of tokens. Punctuation is replaced with a space if neither a preceding or succeeding characters is not a number. Otherwise, the punctuation is replaced with an empty string if the preceding characters are not numbers. Otherwise, the punctuation remains as is. A longest common sequence specifies concatenating of two strings if they match previously observed/learned longest common patterns. Abbreviations and acronyms are standardized across domain-specific acronyms.

Tokenized data is split on the whitespace. Tokenization is the process of separating a string into a list of tokens. Tokens are useful for locating valuable patterns and replacing sensitive data elements with non-sensitive ones. The Whitespace Tokenizer function in the Python programming language separates a string on whitespace characters, such as space, tab, and newline, and replaces accented letters or converts content to lowercase. N-grams are collected and filtered by learned importance to down select a subset of critical features. Examples of application of each of the rules are seen in the third column of the table in FIG. 13.

Figure 14:
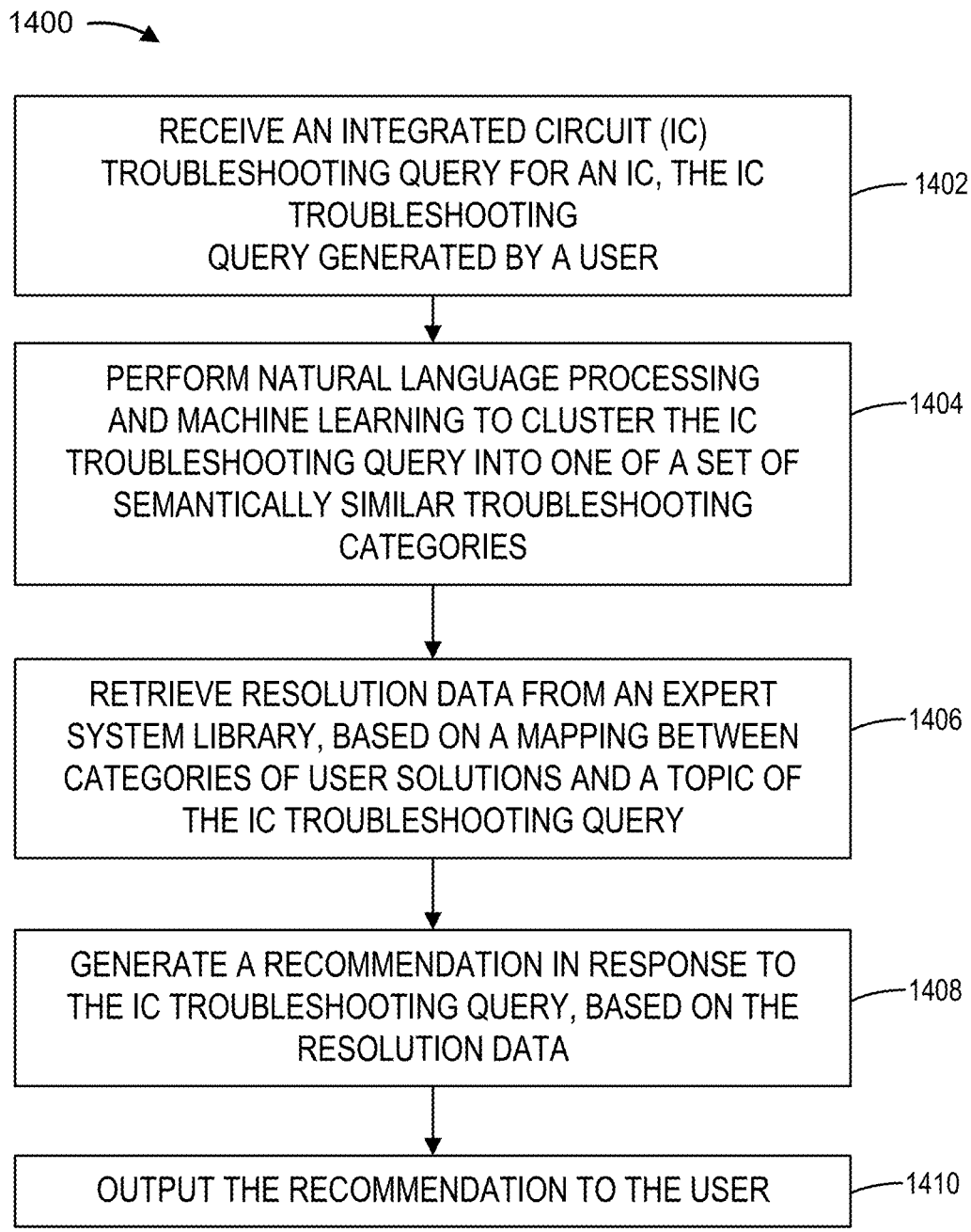
FIG. 14 is a flow diagram illustrating an example process performed, for example, by a processor, in accordance with various aspects of the present disclosure.

FIG. 14 is a flow diagram illustrating an example process 1400 performed, for example, by a processor, in accordance with various aspects of the present disclosure. The example process 1400 is an example of a machine learning and natural language processing-based system for system-on-chip (SoC) troubleshooting. As shown in FIG. 14, in some aspects, the process 1400 may include receiving an integrated circuit (IC) troubleshooting query for an IC. The IC troubleshooting query is received from a user (block 1402). For example, the IC troubleshooting query may be associated with an emulation platform for the IC or a test chip implementation for the IC.

In some aspects, the process 1400 may also include performing natural language processing and machine learning to cluster the IC troubleshooting query into one of a number of semantically similar troubleshooting categories (block 1404). For example, natural language processing and machine learning may identify the user and extract metadata from the IC troubleshooting query, the metadata corresponding to at least one categorical feature vector and at least one metadata filter. The natural language processing and machine learning may include performing a latent Dirichlet allocation and support vector machine processing on unstructured text data in the troubleshooting query.

In some aspects, the process 1400 may further include retrieving resolution data from an expert system library, based on a mapping between categories of user solutions and a topic of the IC troubleshooting query (block 1406). In some aspects, the process 1400 may also include generating a recommendation in response to the IC troubleshooting query, based on the resolution data (block 1408). For example, the recommendation may comprise relevant historical resolution data and an expert technician assigned to the troubleshooting query. In some aspects, the process 1400 may also include outputting the recommendation to the user (block 1410).

Example Aspects

Aspect 1: A processor-implemented method, comprising: receiving an integrated circuit (IC) troubleshooting query for an IC, wherein the IC troubleshooting query is received from a user; performing natural language processing and machine learning to cluster the IC troubleshooting query into one of a plurality of semantically similar troubleshooting categories; retrieving resolution data from an expert system library, based on a mapping between categories of user solutions and a topic of the IC troubleshooting query; generating a recommendation in response to the IC troubleshooting query, based on the resolution data; and outputting the recommendation to the user.

Aspect 2: The method of Aspect 1, further comprising reporting an unknown issue when no resolution data in the expert system library corresponds to the topic of the IC troubleshooting query.

Aspect 3: The method of Aspect 1 or 2, in which performing the natural language processing and machine learning comprises identifying the user and extracting metadata from the IC troubleshooting query, the metadata corresponding to at least one categorical feature vector and at least one metadata filter.

Aspect 4: The method of any of the preceding aspects, in which performing the natural language processing and machine learning further comprises performing a latent Dirichlet allocation and support vector machine processing on unstructured text data in the IC troubleshooting query.

Aspect 5: The method of any of the preceding aspects, in which the recommendation comprises relevant historical resolution data and an expert technician assigned to the IC troubleshooting query.

Aspect 6: The method of any of the preceding aspects, in which the IC troubleshooting query is associated with an emulation platform for the IC or a test chip implementation for the IC.

Aspect 7: The method of any of the preceding aspects, in which the emulation platform is implemented on a field programmable gate array (FPGA).

Aspect 8: The method of any of the preceding aspects, further comprising performing unsupervised density based clustering of historical IC troubleshooting queries to generate the troubleshooting categories.

Aspect 9: The method of any of the preceding aspects, further comprising using a support vector machine (SVM) to perform classification based on topic cluster labels.

Aspect 10: An apparatus comprising: a memory; and at least one processor coupled to the memory, the at least one processor configured: to receive an integrated circuit (IC) troubleshooting query for an IC, wherein the IC troubleshooting query is received from a user; to perform natural language processing and machine learning to cluster the IC troubleshooting query into one of a plurality of semantically similar troubleshooting categories; to retrieve resolution data from an expert system library, based on a mapping between categories of user solutions and a topic of the IC troubleshooting query; to generate a recommendation in response to the IC troubleshooting query, based on the resolution data; and to output the recommendation to the user.

Aspect 11: The apparatus of Aspect 10, in which the at least one processor is further configured to report an unknown issue when no resolution data corresponds to the topic of the IC troubleshooting query.

Aspect 12: The apparatus of Aspect 10 or 11, in which the at least one processor is further configured to perform the natural language processing and machine learning by identifying the user and extracting metadata from the IC troubleshooting query, the metadata corresponding to at least one categorical feature vector and at least one metadata filter.

Aspect 13: The apparatus of any of the Aspects 10-12, in which the at least one processor is further configured to perform the natural language processing and machine learning by performing a latent Dirichlet allocation and support vector machine processing on unstructured text data in the IC troubleshooting query.

Aspect 14: The apparatus of any of the Aspects 10-13, in which the recommendation comprises relevant historical resolution data and an expert technician assigned to the IC troubleshooting query.

Aspect 15: The apparatus of any of the Aspects 10-14, in which the IC troubleshooting query is associated with an emulation platform for the IC or a test chip implementation for the IC.

Aspect 16: The apparatus of any of the Aspects 10-15, in which the emulation platform is implemented on a field programmable gate array (FPGA).

Aspect 17: The apparatus of any of the Aspects 10-16, in which the at least one processor is further configured to perform unsupervised density based clustering of historical IC troubleshooting queries to generate the troubleshooting categories.

Aspect 18: The apparatus of any of the Aspects 10-17, in which the at least one processor is further configured to use a support vector machine (SVM) to perform classification based on topic cluster labels.

Aspect 19: An apparatus comprising: means for receiving an integrated circuit (IC) troubleshooting query for an IC, wherein the IC troubleshooting query is received from a user; means for performing natural language processing and machine learning to cluster the IC troubleshooting query into one of a plurality of semantically similar troubleshooting categories; means for retrieving resolution data from an expert system library, based on a mapping between categories of user solutions and a topic of the IC troubleshooting query; means for generating a recommendation in response to the IC troubleshooting query, based on the resolution data; and means for outputting the recommendation to the user.

Aspect 20: The apparatus of Aspect 19, further comprising means for reporting an unknown issue when no resolution data corresponds to the topic of the IC troubleshooting query.

Aspect 21: The apparatus of Aspect 19 or 20, in which the means for performing the natural language processing and machine learning further comprises means for identifying the user and means for extracting metadata from the IC troubleshooting query, the metadata corresponding to at least one categorical feature vector and at least one metadata filter.

Aspect 22: The apparatus of any of the Aspects 19-21, in which the means for performing the natural language processing and machine learning further comprises means for performing a latent Dirichlet allocation and support vector machine processing on unstructured text data in the IC troubleshooting query.

Aspect 23: The apparatus of any of the Aspects 19-22, in which the recommendation comprises relevant historical resolution data and an expert technician assigned to the IC troubleshooting query.

Aspect 24: The apparatus of any of the Aspects 19-23, in which the IC troubleshooting query is associated with an emulation platform for the IC or a test chip implementation for the IC.

Aspect 25: The apparatus of any of the Aspects 19-24, in which the emulation platform is implemented on a field programmable gate array (FPGA).

Aspect 26: The apparatus of any of the Aspects 19-25, further comprising means for performing unsupervised density based clustering of historical IC troubleshooting queries to generate the troubleshooting categories.

Aspect 27: The apparatus of any of the Aspects 19-26, further comprising means for using a support vector machine (SVM) to perform classification based on topic cluster labels.

Aspect 28: A non-transitory computer-readable medium having program code recorded thereon, the program code executed by a processor and comprising: program code to receive an integrated circuit (IC) troubleshooting query for an IC, wherein the IC troubleshooting query is received from a user; program code to perform natural language processing and machine learning to cluster the IC troubleshooting query into one of a plurality of semantically similar troubleshooting categories; program code to retrieve resolution data from an expert system library, based on a mapping between categories of user solutions and a topic of the IC troubleshooting query; program code to generate a recommendation in response to the IC troubleshooting query, based on the resolution data; and program code to output the recommendation to the user.

Aspect 29: The non-transitory computer-readable medium of Aspect 28, in which the program code further comprises program code to report an unknown issue when no resolution data corresponds to the topic of the IC troubleshooting query.

Aspect 30: The non-transitory computer-readable medium of Aspect 28 or 29, in which the program code to perform the natural language processing and machine learning further comprises program code to identify the user and program code to extract metadata from the IC troubleshooting query, the metadata corresponding to at least one categorical feature vector and at least one metadata filter.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. A processor-implemented method, comprising:
   receiving a first integrated circuit (IC) troubleshooting query describing a first error, the first error comprising an issue with an emulation platform for an IC, wherein the first IC troubleshooting query is received from a user;
   receiving a second integrated circuit (IC) troubleshooting query describing a second error, the second error comprising an issue with a test chip implementation of the IC, wherein the second IC troubleshooting query is received from the user;
   applying a customizable filter to the first IC troubleshooting query and the second IC troubleshooting query;
   determining whether the first IC troubleshooting query relates to either the emulation platform or the test chip implementation, based on the filter;
   determining whether the second IC troubleshooting query relates to either the emulation platform or the test chip implementation, based on the filter;
   performing natural language processing and machine learning to cluster the first IC troubleshooting query into a topic of the first IC troubleshooting query, which corresponds to one of a plurality of semantically similar troubleshooting categories for the emulation platform based on the determining;
   performing natural language processing and machine learning to cluster the second IC troubleshooting query into a topic of the second IC troubleshooting query, which corresponds to one of a plurality of semantically similar troubleshooting categories for the test chip implementation based on the determining;
   retrieving resolution data from an expert system library, based on a mapping between categories of user solutions and the topic of the first IC troubleshooting query;
   generating a first recommendation in response to the first IC troubleshooting query, based on the resolution data;
   outputting the first recommendation to the user for debugging the first error with the emulation platform;
   retrieving resolution data from the expert system library, based on a mapping between categories of user solutions and the topic of the second IC troubleshooting query;
   generating a second recommendation in response to the second IC troubleshooting query, based on the resolution data; and
   outputting the second recommendation to the user for debugging the second error with the test chip.

2. The method of claim 1, further comprising reporting an unknown issue when no resolution data in the expert system library corresponds to the topic of the first IC troubleshooting query.

3. The method of claim 1, in which performing the natural language processing and machine learning to cluster the first IC troubleshooting query comprises identifying the user and extracting metadata from the first IC troubleshooting query, the metadata corresponding to at least one categorical feature vector and at least one metadata filter.

4. The method of claim 3, in which performing the natural language processing and machine learning to cluster the first IC troubleshooting query further comprises performing a latent Dirichlet allocation and support vector machine processing on unstructured text data in the first IC troubleshooting query.

5. The method of claim 1, in which the first recommendation comprises relevant historical resolution data and an expert technician assigned to the first IC troubleshooting query.

6. The method of claim 1, in which the emulation platform is implemented on a field programmable gate array (FPGA).

7. The method of claim 1, further comprising performing unsupervised density based clustering of historical IC troubleshooting queries to generate the troubleshooting categories.

8. The method of claim 1, further comprising using a support vector machine (SVM) to perform classification based on topic cluster labels.

9. An apparatus comprising:
   a memory; and
   at least one processor coupled to the memory, the at least one processor configured:
      to receive a first integrated circuit (IC) troubleshooting query describing a first error, the first error comprising an issue with an emulation platform for an IC, wherein the first IC troubleshooting query is received from a user;
      to receive a second integrated circuit (IC) troubleshooting query describing a second error, the second error comprising an issue with a test chip implementation of the IC, wherein the second IC troubleshooting query is received from the user;
      to apply a customizable filter to the first IC troubleshooting query and the second IC troubleshooting query;
      to determine whether the first IC troubleshooting query relates to either the emulation platform or the test chip implementation, based on the filter;
      to determine whether the second IC troubleshooting query relates to either the emulation platform or the test chip implementation, based on the filter;
      to perform natural language processing and machine learning to cluster the first IC troubleshooting query into a topic of the first IC trouble shooting query, which corresponds to one of a plurality of semantically similar troubleshooting categories for the emulation platform based on the determining;
      to perform natural language processing and machine learning to cluster the second IC troubleshooting query into a topic of the second IC troubleshooting query, which corresponds to one of a plurality of semantically similar troubleshooting categories for the test chip implementation based on the determining;

to retrieve resolution data from an expert system library, based on a mapping between categories of user solutions and the topic of the first IC troubleshooting query;

to generate a recommendation in response to the first IC troubleshooting query, based on the resolution data; and to output the recommendation to the user for debugging the first error with the emulation platform.

10. The apparatus of claim 9, in which the at least one processor is further configured to report an unknown issue when no resolution data corresponds to the topic of the first IC troubleshooting query.

11. The apparatus of claim 9, in which the at least one processor is further configured to perform the natural language processing and machine learning to cluster the first IC troubleshooting query by identifying the user and extracting metadata from the first IC troubleshooting query, the metadata corresponding to at least one categorical feature vector and at least one metadata filter.

12. The apparatus of claim 11, in which the at least one processor is further configured to perform the natural language processing and machine learning to cluster the first IC troubleshooting query by performing a latent Dirichlet allocation and support vector machine processing on unstructured text data in the first IC troubleshooting query.

13. The apparatus of claim 9, in which the recommendation comprises relevant historical resolution data and an expert technician assigned to the first IC troubleshooting query.

14. The apparatus of claim 9, in which the emulation platform is implemented on a field programmable gate array (FPGA).

15. The apparatus of claim 9, in which the at least one processor is further configured to perform unsupervised density based clustering of historical IC troubleshooting queries to generate the troubleshooting categories.

16. The apparatus of claim 9, in which the at least one processor is further configured to use a support vector machine (SVM) to perform classification based on topic cluster labels.

17. An apparatus comprising:
means for receiving a first integrated circuit (IC) troubleshooting query describing a first error, the first error comprising an issue with an emulation platform for an IC, wherein the first IC troubleshooting query is received from a user;
means for receiving a second integrated circuit (IC) troubleshooting query describing a second error, the second error comprising an issue with a test chip implementation of the IC, wherein the second IC troubleshooting query is received from the user;
means for applying a customizable filter to the first IC troubleshooting query and the second IC troubleshooting query;
means for determining whether the first IC troubleshooting query relates to either the emulation platform or the test chip implementation, based on the filter;
means for determining whether the second IC troubleshooting query relates to either the emulation platform or the test chip implementation, based on the filter;
means for performing natural language processing and machine learning to cluster the first IC troubleshooting query into a topic of the first IC trouble shooting query, which corresponds to one of a plurality of semantically similar troubleshooting categories for the emulation platform based on the means for determining;
means for performing natural language processing and machine learning to cluster the second IC troubleshooting query into a topic of the second IC troubleshooting query, which corresponds to one of a plurality of semantically similar troubleshooting categories for the test chip implementation based on the determining;
means for retrieving resolution data from an expert system library, based on a mapping between categories of user solutions and the topic of the first IC troubleshooting query;
means for generating a recommendation in response to the first IC troubleshooting query, based on the resolution data; and
means for outputting the recommendation to the user for debugging the first error with the emulation platform.

18. The apparatus of claim 17, further comprising means for reporting an unknown issue when no resolution data corresponds to the topic of the first IC troubleshooting query.

19. The apparatus of claim 17, in which the means for performing the natural language processing and machine learning to cluster the first IC troubleshooting query further comprises means for identifying the user and means for extracting metadata from the first IC troubleshooting query, the metadata corresponding to at least one categorical feature vector and at least one metadata filter.

20. The apparatus of claim 19, in which the means for performing the natural language processing and machine learning to cluster the first IC troubleshooting query further comprises means for performing a latent Dirichlet allocation and support vector machine processing on unstructured text data in the first IC troubleshooting query.

21. The apparatus of claim 17, in which the recommendation comprises relevant historical resolution data and an expert technician assigned to the first IC troubleshooting query.

22. The apparatus of claim 17, in which the emulation platform is implemented on a field programmable gate array (FPGA).

23. The apparatus of claim 17, further comprising means for performing unsupervised density based clustering of historical IC troubleshooting queries to generate the troubleshooting categories.

24. The apparatus of claim 17, further comprising means for using a support vector machine (SVM) to perform classification based on topic cluster labels.

25. A non-transitory computer-readable medium having program code recorded thereon, the program code executed by at least one processor and comprising:
program code to receive a first integrated circuit (IC) troubleshooting query describing a first error, the first error comprising an issue with an emulation platform for an IC, wherein the first IC troubleshooting query is received from a user;
program code to receive a second integrated circuit (IC) troubleshooting query describing a second error, the second error comprising an issue with a test chip implementation of the IC, wherein the second IC troubleshooting query is received from the user;
program code to apply a customizable filter to the first IC troubleshooting query and the second IC troubleshooting query;
program code to determine whether the first IC troubleshooting query relates to either the emulation platform or the test chip implementation, based on the filter;

program code to determine whether the second IC troubleshooting query relates to either the emulation platform or the test chip implementation, based on the filter;

program code to perform natural language processing and machine learning to cluster the first IC troubleshooting query into a topic of the first IC trouble shooting query, which corresponds to one of a plurality of semantically similar troubleshooting categories for the emulation platform based on the determining;

program code to perform natural language processing and machine learning to cluster the second IC troubleshooting query into a topic of the second IC troubleshooting query, which corresponds to one of a plurality of semantically similar troubleshooting categories for the test chip implementation based on the determining;

program code to retrieve resolution data from an expert system library, based on a mapping between categories of user solutions and the topic of the first IC troubleshooting query;

program code to generate a recommendation in response to the first IC troubleshooting query, based on the resolution data; and program code to output the recommendation to the user for debugging the first error with the emulation platform.

26. The non-transitory computer-readable medium of claim 25, in which the program code further comprises program code to report an unknown issue when no resolution data corresponds to the topic of the first IC troubleshooting query.

27. The non-transitory computer-readable medium of claim 25, in which the program code to perform the natural language processing and machine learning to cluster the first IC troubleshooting query further comprises program code to identify the user and program code to extract metadata from the first IC troubleshooting query, the metadata corresponding to at least one categorical feature vector and at least one metadata filter.

* * * * *